(12) United States Patent
Wilcock

(10) Patent No.: US 10,229,067 B2
(45) Date of Patent: Mar. 12, 2019

(54) RETRIEVING AND CONVERTING OFFLINE DATA

(71) Applicant: International Business Machines Corporation, Armonk, NY (US)

(72) Inventor: Glenn R. Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 15/018,700

(22) Filed: Feb. 8, 2016

(65) Prior Publication Data

US 2017/0228325 A1 Aug. 10, 2017

(51) Int. Cl.
*G06F 12/14* (2006.01)
*G06F 17/30* (2006.01)
*G06F 3/06* (2006.01)

(52) U.S. Cl.
CPC ........ *G06F 12/1408* (2013.01); *G06F 3/0604* (2013.01); *G06F 3/0643* (2013.01); *G06F 3/0673* (2013.01); *G06F 17/30569* (2013.01); *G06F 2212/402* (2013.01)

(58) Field of Classification Search
CPC ........... G06F 12/1408; G06F 17/30569; G06F 3/0643; G06F 3/0604; G06F 3/0673; G06F 2212/402; G06F 12/14; G06F 17/30; G06F 3/06
USPC ....................................................... 713/193
See application file for complete search history.

(56) References Cited

U.S. PATENT DOCUMENTS

| 6,591,272 | B1 * | 7/2003 | Williams .......... G06F 17/30607 |
| 8,352,432 | B2 | 1/2013 | Prahlad et al. |
| 8,683,130 | B2 | 3/2014 | Benhase et al. |
| 8,756,249 | B1 | 6/2014 | Wallace et al. |
| 2007/0233992 | A1 | 10/2007 | Sato |
| 2009/0240737 | A1 | 9/2009 | Hardisty et al. |
| 2010/0332401 | A1 | 12/2010 | Prahlad et al. |
| 2010/0332561 | A1 | 12/2010 | Prahlad et al. |
| 2012/0005165 | A1 | 1/2012 | Tsai et al. |
| 2012/0078931 | A1 | 3/2012 | Jaquette |
| 2013/0046950 | A1 | 2/2013 | Coronado et al. |
| 2014/0040211 | A1 | 2/2014 | Avery et al. |
| 2014/0075455 | A1 * | 3/2014 | Annapragada .......... G06F 9/542 719/318 |
| 2017/0228370 | A1 | 8/2017 | Wilcock |

OTHER PUBLICATIONS

Wilcock, G., U.S. Appl. No. 15/018,666, filed Feb. 8, 2016.
List of IBM Patents or Patent Applications Treated as Related.
Alatorre et al. "Intelligent Information Lifecycle Management in Virtualized Storage Environments," IEEE, Global Conference (SRII), 2014 Annual SRII, Apr. 23-25, 2014, pp. 9-18.
(Continued)

*Primary Examiner* — Ashokkumar B Patel
*Assistant Examiner* — Quazi Farooqui
(74) *Attorney, Agent, or Firm* — Zilka-Kotab, P.C.

(57) ABSTRACT

A computer-implemented method according to one embodiment includes receiving a request for data, where the data is stored in a first format in a first storage area of a system, retrieving the data stored in the first format from the first storage area of the system, converting the data from the first format to a second format, and returning the data in the second format.

20 Claims, 5 Drawing Sheets

(56) References Cited

OTHER PUBLICATIONS

Kern, R.F., "IBM System z & DS8000 Technology Synergy," IBM ATS Americas Disk Storage, Jul. 21, 2009, pp. 1-25.
Mattman et al., "Experiments with Storage and Preservation of NASA's Planetary Data via the Cloud," IT Pro, IEEE Computer Society, Sep./Oct. 2010, pp. 28-35.
Nguyen et al., "Content Server System Architecture for Providing Differentiated Levels of Service in a Digital Preservation Cloud," 2011 IEEE 4th International Conference on Cloud Computing, Jul. 4-9, 2011, pp. 557-564.
Van Horn et al., "Why share data? Lessons learned from the fMRIDC," NeuroImage, vol. 82, Nov. 2013, pp. 677-682.
Anonymous, "EMC Object-Based Storage for Active Archiving and Application Development," Taneja Group, Nov. 2012, pp. 1-12.
Anonymous, "Quantum Lattus: Next-Generation Object Storage for Big Data Archives," Quantum, Sep. 2013, pp. 1-10.
Non-Final Office Action from U.S. Appl. No. 15/018,666, dated Mar. 7, 2018.
Final Office Action from U.S. Appl. No. 15/018,666, dated Sep. 28, 2018.
Advisory Action from U.S. Appl. No. 15/018,666, dated Dec. 21, 2018.

* cited by examiner

RETRIEVING AND CONVERTING OFFLINE DATA

BACKGROUND

The present invention relates to data retrieval, and more specifically, this invention relates to retrieving data and converting it to another format.

Storage solutions enable online data to be moved to an offline object store. When the data in the offline object store needs to be accessed, the data is moved back to online disk storage. However, some data in offline object storage is of read only nature and does not need to be updated after it is subsequently referenced. Even though this data is read only, it consumes space on one or more online disks when it is retrieved from object storage in order to make it available to the application that has requested the data. There is therefore a need to reduce online storage requirements when accessing this data.

SUMMARY

A computer-implemented method according to one embodiment includes receiving a request for data, where the data is stored in a first format in a first storage area of a system, retrieving the data stored in the first format from the first storage area of the system, converting the data from the first format to a second format, and returning the data in the second format.

According to another embodiment, a computer program product for dynamically managing a table of contents comprises a computer readable storage medium having program instructions embodied therewith, wherein the computer readable storage medium is not a transitory signal per se, and where the program instructions are executable by a processor to cause the processor to perform a method. The method comprises receiving, by the processor, a request for data, where the data is stored in a first format in a first storage area of a system, retrieving, by the processor, the data stored in the first format from the first storage area of the system, converting, by the processor, the data from the first format to a second format, and returning, by the processor, the data in the second format.

A system according to another embodiment includes a processor and logic integrated with and/or executable by the processor, where the logic is configured to receive a request for data, where the data is stored in a first format in a first storage area of a system, retrieve the data stored in the first format from the first storage area of the system, convert the data from the first format to a second format, and return the data in the second format.

Other aspects and embodiments of the present invention will become apparent from the following detailed description, which, when taken in conjunction with the drawings, illustrate by way of example the principles of the invention.

DETAILED DESCRIPTION

Figure 1:
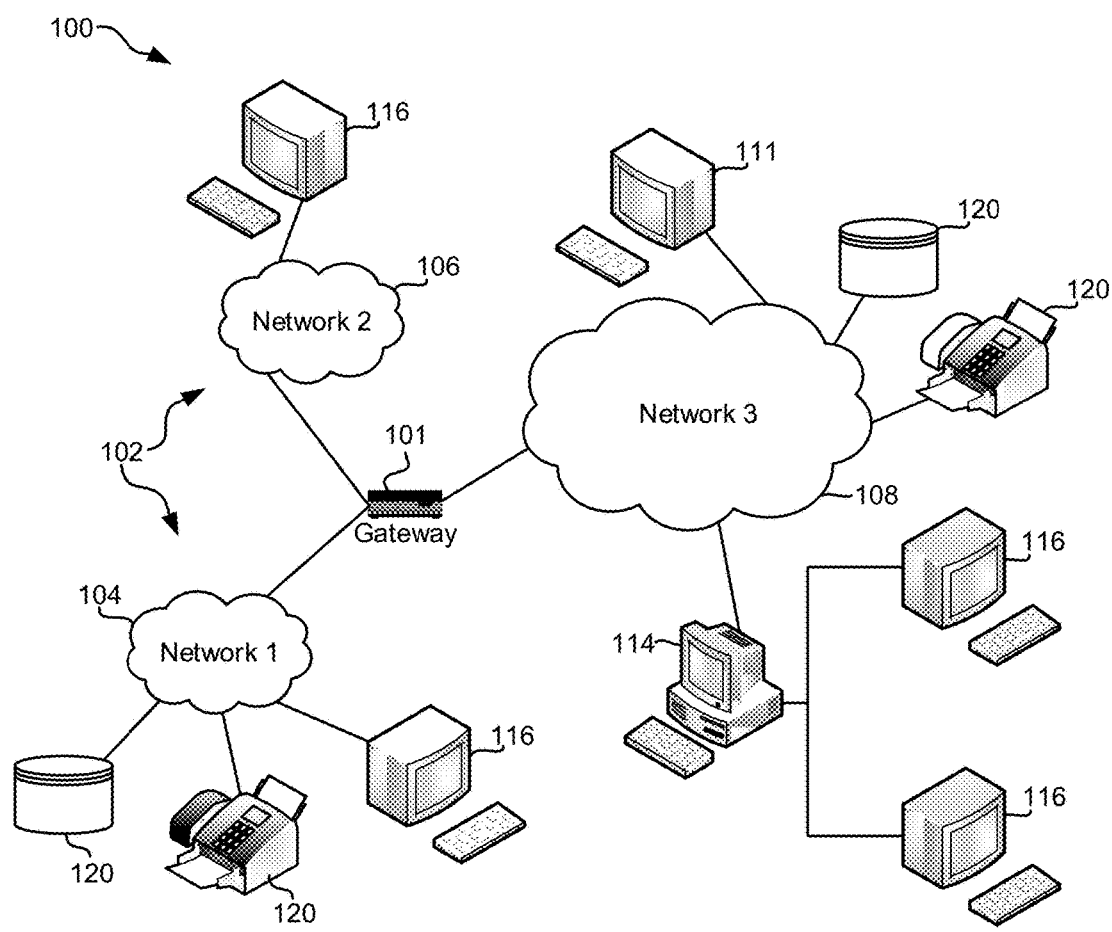
FIG. 1 illustrates a network architecture, in accordance with one embodiment.

The following description discloses several preferred embodiments of systems, methods and computer program products for retrieving and converting offline data. Various embodiments provide a method to present retrieved and converted offline data directly to a requesting application instead of storing it in online storage.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for retrieving and converting offline data.

In one general embodiment, a computer-implemented method includes receiving a request for data, where the data is stored in a first format in a first storage area of a system, retrieving the data stored in the first format from the first storage area of the system, converting the data from the first format to a second format, and returning the data in the second format.

In another general embodiment, a computer program product for dynamically managing a table of contents comprises a computer readable storage medium having program instructions embodied therewith, wherein the computer readable storage medium is not a transitory signal per se, and where the program instructions are executable by a processor to cause the processor to perform a method. The method comprises receiving, by the processor, a request for data, where the data is stored in a first format in a first storage area of a system, retrieving, by the processor, the data stored in the first format from the first storage area of the system, converting, by the processor, the data from the first format to a second format, and returning, by the processor, the data in the second format.

In another general embodiment, a system includes a processor and logic integrated with and/or executable by the processor, where the logic is configured to receive a request for data, where the data is stored in a first format in a first storage area of a system, retrieve the data stored in the first format from the first storage area of the system, convert the data from the first format to a second format, and return the data in the second format.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
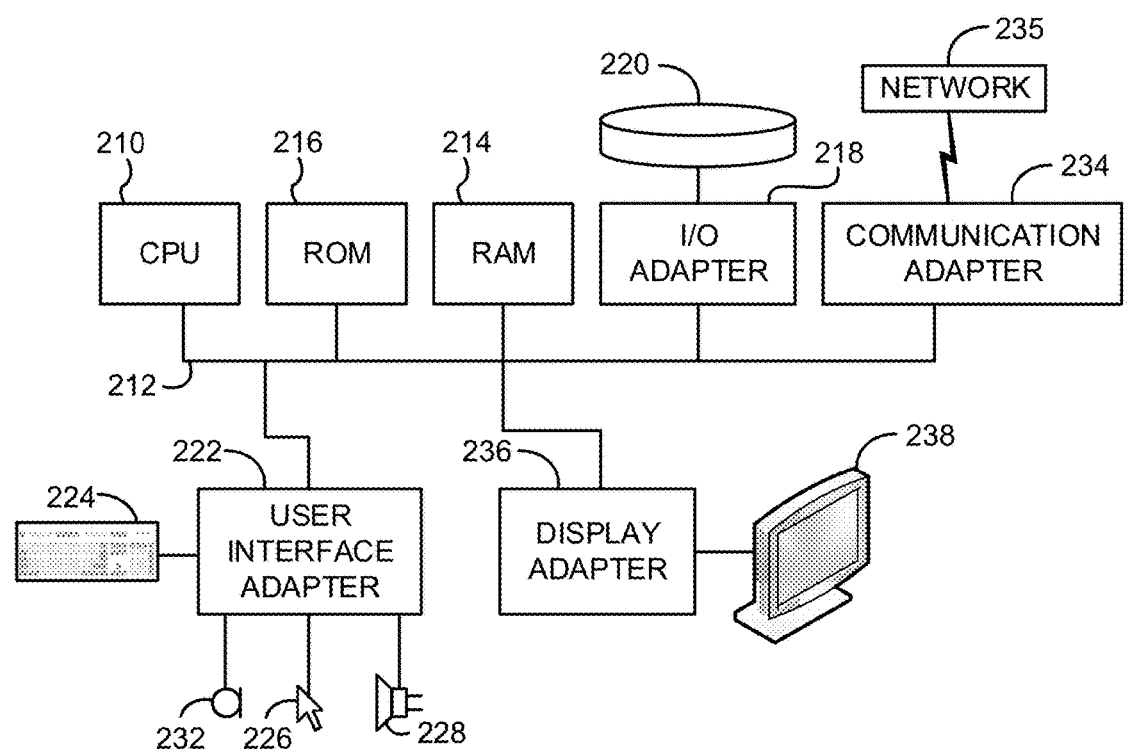
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
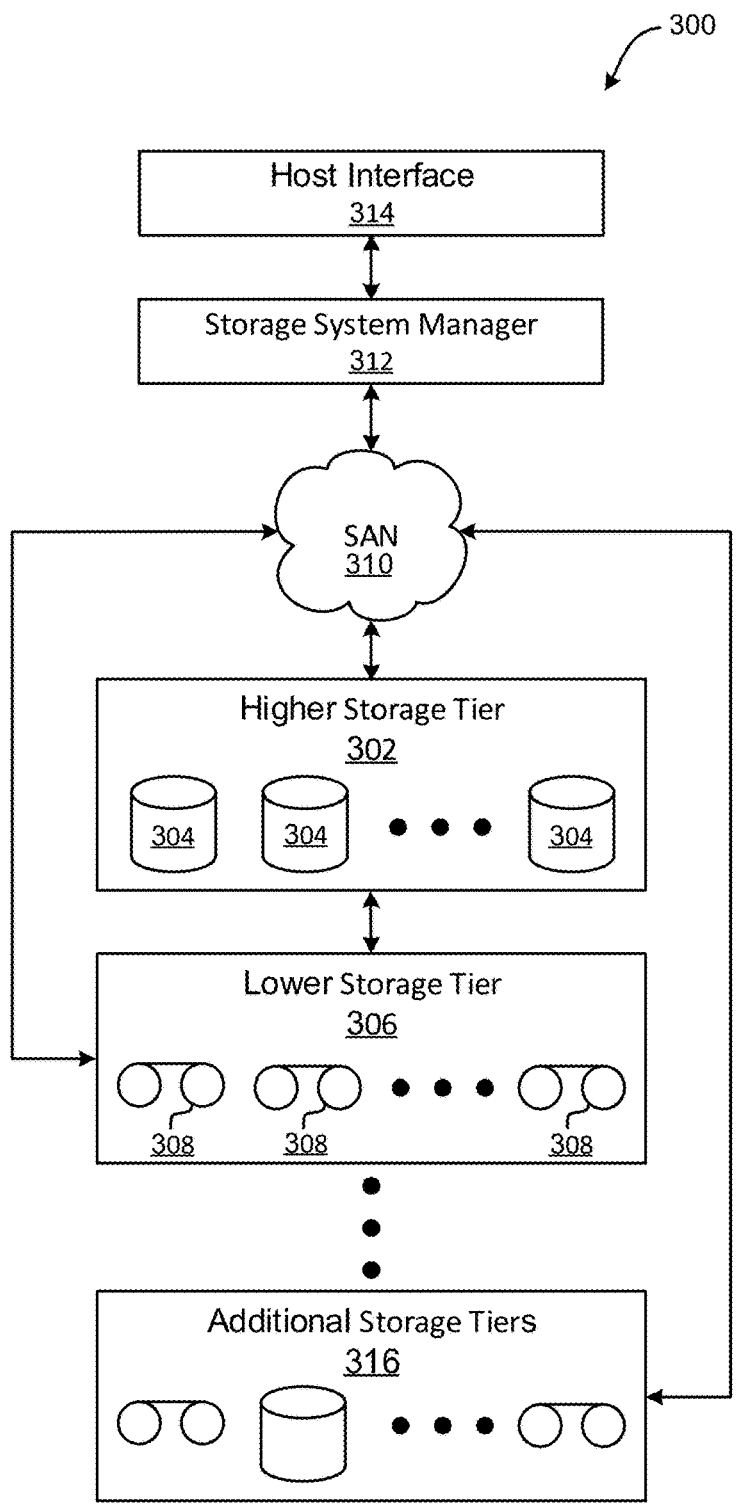
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
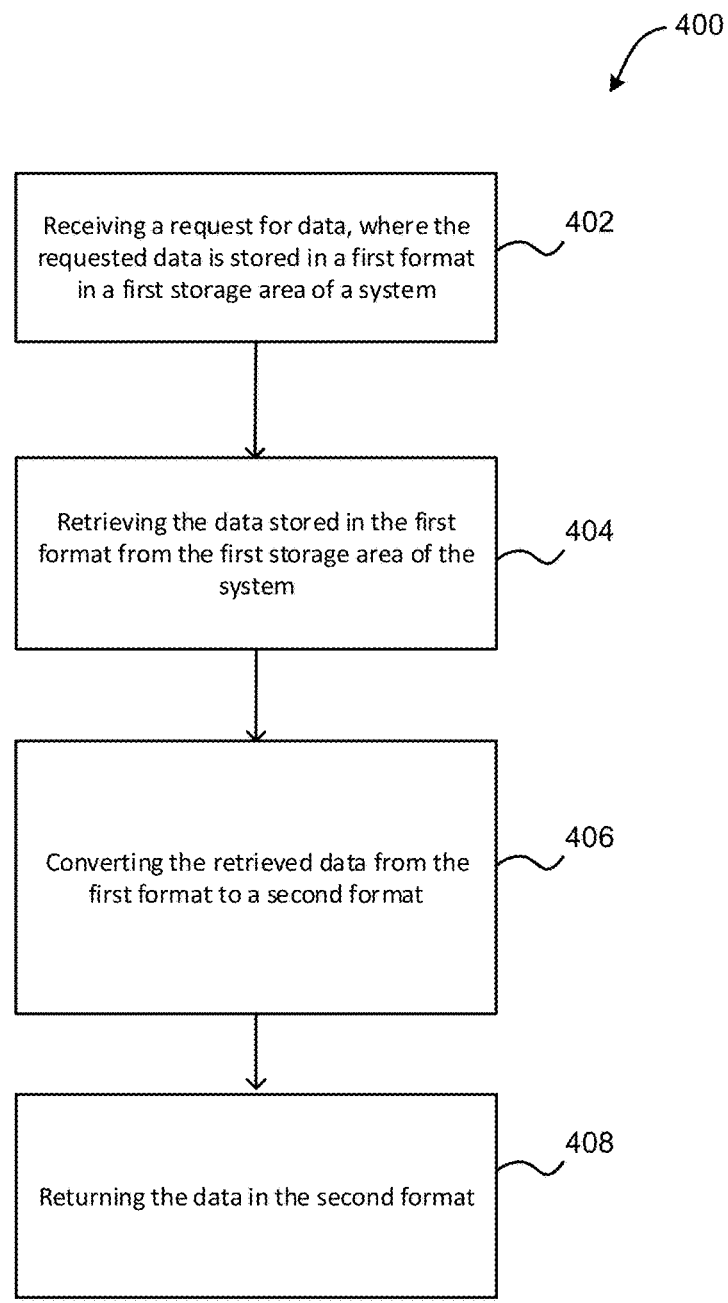
FIG. 4 illustrates a method for retrieving and converting stored data, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request for data is received, the requested data being stored in a first format in a first storage area of a system. In one embodiment, the request for the data may be received by a software layer. For example, the request for the data may be received by software (e.g., storage management software such as MCStore, etc.) within a disk control unit (e.g., a DS8K control unit, etc.). In another embodiment, the request for data may be received from an application within the system. For example, the request for data may be received from an analytical application within the system. In yet another embodiment, the data may include one or more files or any data capable of being stored within the system.

Additionally, in one embodiment, the system may include one or more computing devices (e.g., one or more servers, personal computers, mobile computing devices, etc.). In another embodiment, the system may be included within a cluster of additional systems (e.g., a sysplex, etc.). In yet another embodiment, the first format may include an encrypted format. For example, the requested data may be encrypted using one or more methods and may be stored in an encrypted format in the first storage area of the system. In another embodiment, the requested data may have been encrypted by the storage management software before being stored in the first storage area of the system.

In still another embodiment, the first format may include a compressed format. For example, the requested data may be compressed using one or more methods and may be stored in a compressed format in the first storage area of the system. In another embodiment, the requested data may have been compressed by the storage management software before being stored in the first storage area of the system. In another embodiment, the first format may include both a compressed and encrypted format.

For example, the requested data may have been converted by the storage management software from a count key data (CKD) format to an encrypted and compressed object format, and may be stored within the first storage area of the system in the encrypted and compressed object format. In yet another embodiment, the first format may include an archived format. For example, the requested data may be stored in offline storage in an archived data format that is not directly accessible by the requesting application.

Further, in one embodiment, the first storage area of the system may include an offline storage area of the system. For example, the first storage area of the system may include cloud storage (e.g., one or more servers implementing a cloud data storage model, etc.). In another embodiment, the requested data may be stored as one or more objects within the first storage area. In yet another embodiment, a name of the one or more objects within the first storage area of the system may include a physical location of the data within a second storage area of the system (e.g., an online storage area of the system, etc.). In still another embodiment, the requested data may include a first portion of a file within the system. For example, the requested data may include one or more physical extents that comprise a data portion of a file.

In yet another embodiment, a second portion of the file may be stored within a second storage area within the system. For example, the second storage area of the system may include an online storage area of the system, such as a repository space of the system (e.g., a physical hard disk drive of the system, a physical memory of the system, etc.). In another example, the second portion of the file may include metadata such as an identifier of the file, an identifier of one or more users associated with the file, a description of a data portion of the file, etc. In another embodiment, the software layer may reside within the second storage area within the system.

Further still, in one embodiment, the request for the data may include a read request. For example, the request for the data may include a request to read the data. In another embodiment, the requested data may include read only data (e.g., data that can only be read and not modified, etc.). In another embodiment, the data may include physical sequential data. For example, the data may include data that is updated by appending new data to an end of the existing data. In yet another embodiment, the data may include part of a nearline file data. For example, the data may include part of an archived file that is stored utilizing both online and offline storage techniques simultaneously.

Further, as shown in FIG. 4, method 400 may proceed with operation 404, where the data stored in the first format is retrieved from the first storage area of the system. In one embodiment, the data may be retrieved by the software layer. For example, the storage management software that received the request for the data may retrieve the data from the first storage area of the system. In another embodiment, the data may be retrieved from the first storage system using information stored in the second storage system (e.g., the second portion of the file, etc.). For example, metadata stored within the second storage area of the system may include an indication of a location of the requested data within the first storage area of the system. In another example, the metadata may be used by the storage management software to locate and retrieve the requested data within the first storage area of the system.

Further still, as shown in FIG. 4, method 400 may proceed with operation 406, where the retrieved data is converted from the first format to a second format. In one embodiment, the data may be converted by the software layer. For example, the storage management software that received the request for the data may first retrieve the data from the first storage area of the system and may then convert the retrieved data to the second format. In another embodiment, the second format may include one or more of an unencrypted format and an uncompressed format. For example, the requested data may be retrieved from the first storage area in an encrypted and compressed object format, and may be converted from the encrypted and compressed object format (e.g., by decrypting and decompressing, etc.) to the decrypted, decompressed, count key data (CKD) format.

Furthermore, as shown in FIG. 4, method 400 may proceed with operation 408, where the data is returned in the second format. In one embodiment, the data may be returned directly to the entity that requested the data. For example, the data may be returned to an application that sent the request for the data. In another embodiment, the data may be returned by the software layer. For example, the storage management software that received the request for the data may first retrieve the data from the first storage area of the system, may convert the retrieved data to the second format, and may then return the data in the second format directly to the requesting entity, as if the read came directly from an online storage area, without storing the data in an online storage area of the system.

In this way, the requesting entity may directly receive archived data from offline storage without having the data stored in online storage space, which may avoid the consumption of online storage space by the storage management software. Additionally, the requested data may be stored in offline storage in an archived data format that is not directly accessible to the requesting application but may be retrieved and returned to the requesting application by the software layer as though the requested data was stored in online storage.

Figure 5:
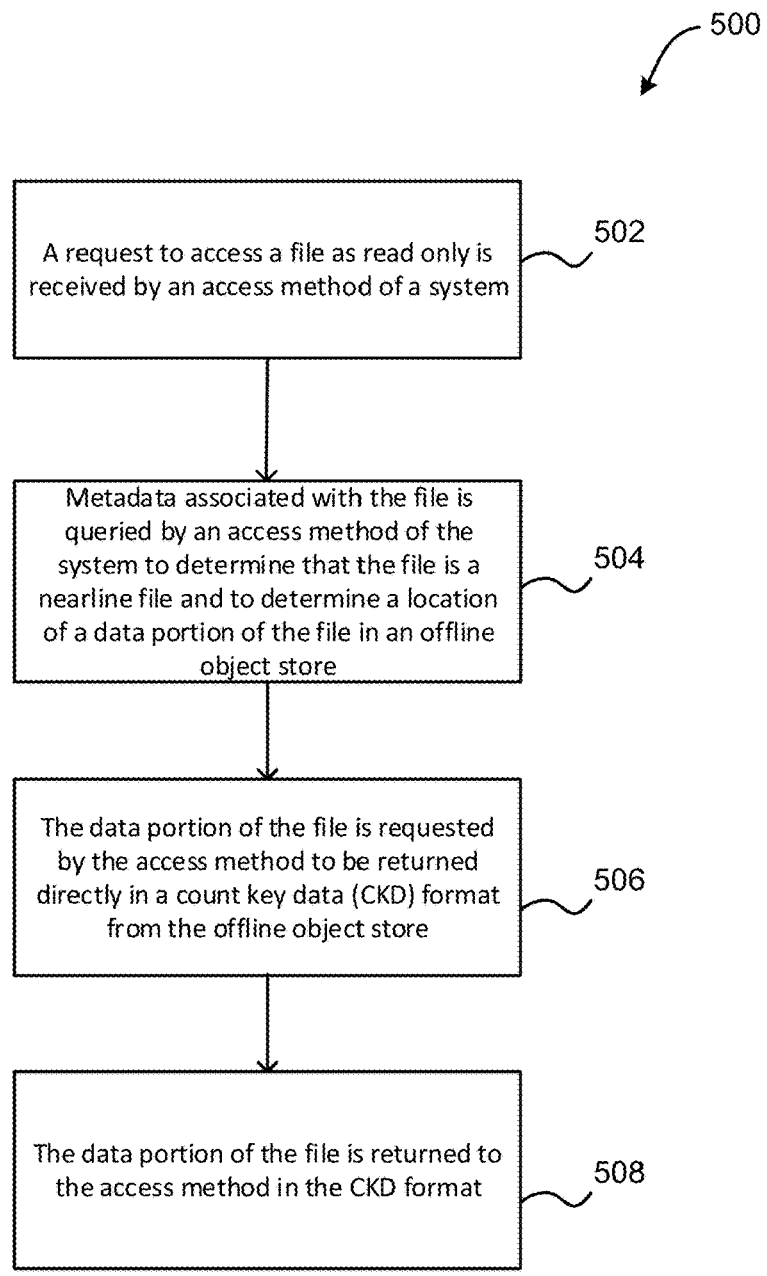
FIG. 5 illustrates a method for performing MCStore data passthrough, in accordance with one embodiment.

Now referring to FIG. 5, a flowchart of a method 500 for performing MCStore data passthrough is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request to access a file as read only is received by an access method of a system. In one embodiment, the file may include a nearline file. For example, the file may include a nearline comprising both online and offline data. In another example, the nearline file may include metadata that represents the file and that is always kept online. In yet another example, the nearline file may include a data portion that is kept in an offline object store, where the container and object name in the offline store may be based on a thinly provisioned space that is allocated on the online logical volume as described in the metadata.

Additionally, method 500 may proceed with operation 504, where metadata associated with the file is queried by an access method of the system to determine that the file is a nearline file and to determine a location of a data portion of the file in an offline object store. In one embodiment, the offline object store may include cloud storage. In another embodiment, the metadata associated with the file may include online data within the system. In yet another embodiment, the metadata may be queried by the access method of the system that opens and reads in data. In still another embodiment, the data portion of the file that is stored in the offline object store may be encrypted and compressed. For example, when MCStore software writes the data portion of the file from a DS8K CKD format disk to an object storage, it may compress and encrypt the data and write the data in an object format as opposed to the original CKD format.

Further, method 500 may proceed with operation 506, where the data portion of the file is requested by the access method to be returned directly in a count key data (CKD) format from the offline object store. In one embodiment, the data retrieval request may be sent to a DS8K to return the data to the standard CKD format on online disk. In another embodiment, as opposed to doing a standard disk read from the disk volume, the access method may issue an MCStore software retrieve request using a volser as the container name, a data set name concatenated with a cylinder head location (e.g., "CCCCcch," etc.) as the object name, and an indicator that the data should be presented directly in CKD format as a normal read as opposed to storing the data back to the online storage. In yet another embodiment, only a portion of the data portion of the file may be requested.

In still another embodiment, for read only data, the data may not be changed after it is read in by an application. As a result, there may be no requirement for an online storage space to maintain any changes. Exploiting this data characteristic, when a retrieve request is sent to the MCStore software, a read only indicator may be passed to the MCStore software that indicates that the data should only be returned to the original CKD format and then presented to a reader as a standard read from the CKD device.

Further still, method 500 may proceed with operation 508, where the data portion of the file is returned to the access method in the CKD format. In one embodiment, the MCStore software may identify the request from the access method, and in response to the request, the MCStore software may retrieve the data from the object store, decompress it, decrypt it, return it to the original CKD format, and then present the data directly to the requestor without writing the data back to online disk storage.

In another embodiment, the request may not be a read only request, but the requested file may include physical sequential data that is updated by appending new data at the end of the file. For example, physical sequential data may be read in via a pass-through technique and then may be updated by writing data to thinly provisioned online storage. This data may later be offloaded to offline cloud storage.

In this way, efficient data retrieval of read only data may be enabled for applications (e.g., analytics applications, etc.). Additionally, historical data may be moved from a low cost object store and may be presented directly to a host application with no online storage space consumption and no host based processing required to move the data. Further, data that is stored in offline storage in an archived data format (e.g., a format that may not be directly accessible to applications and users) may be read by applications as if it resided on online storage. Further still, no online storage may be consumed when reading the data by the application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving a read-only request from a requestor to access a file, where a data portion of the file is encrypted, compressed, and stored in an offline storage area of a system;
   determining that the file is a nearline file, based on a metadata portion of the file stored in an online storage area of the system, where the metadata portion of the file includes an identifier of the file, a description of the data portion of the file, and a location of the data portion of the file within the offline storage area of the system;
   determining the location of the data portion of the file within the offline storage area of the system, based on the metadata portion of the file;
   retrieving the data portion of the file from the offline storage area of the system;
   converting the data portion of the file, including decompressing and decrypting the data portion of the file to create a decompressed and decrypted data portion of the file; and
   returning the decompressed and decrypted data portion of the file directly to the requestor without writing the decompressed and decrypted data portion of the file to the online storage area of the system.

2. The computer-implemented method of claim 1, wherein the read-only request includes a retrieve request that includes a read-only indicator that indicates that the data portion of the file should only be returned to an original count key data (CKD) format and then presented to the requestor as a standard read from a CKD device.

3. The computer-implemented method of claim 1, wherein retrieving the data portion of the file includes issuing a software retrieve request using a volser as a container name, a data set name concatenated with a cylinder head location as an object name, and an indicator that the data portion of the file should be presented directly in CKD format as a normal read as opposed to storing the data portion of the file back to the online storage area of the system.

4. The computer-implemented method of claim 1, wherein the requested file includes one or more physical extents.

5. The computer-implemented method of claim 1, wherein the requested file includes read only data.

6. The computer-implemented method of claim 1, wherein the requested file includes physical sequential data.

7. The computer-implemented method of claim 1, wherein the metadata portion of the file further includes an identifier of one or more users associated with the file.

8. The computer-implemented method of claim 1, wherein after the data portion of the file is retrieved, the data portion of the file is converted to a count key data (CKD) format.

9. The computer-implemented method of claim 1, wherein storage management software receives the read-only request to access the file from the requestor, retrieves the data portion of the file from the offline storage area of the system, converts the data portion of the file to create the decompressed and decrypted data portion of the file, and returns the decompressed and decrypted data portion of the file directly to the requestor.

10. The computer-implemented method of claim 9, wherein the storage management software resides within the online storage area within the system.

11. A computer program product for dynamically managing a table of contents, the computer program product comprising a computer readable storage medium having program instructions embodied therewith, wherein the computer readable storage medium is not a transitory signal per se, the program instructions executable by a processor to cause the processor to perform a method comprising:
   receiving, by the processor, a read-only request from a requestor to access a file, where a data portion of the file is encrypted, compressed, and stored in an offline storage area of a system;
   determining, by the processor, that the file is a nearline file, based on a metadata portion of the file stored in an online storage area of the system, where the metadata portion of the file includes an identifier of the file, a description of the data portion of the file, and a location of the data portion of the file within the offline storage area of the system;

determining, by the processor, the location of the data portion of the file within the offline storage area of the system, based on the metadata portion of the file;

retrieving, by the processor, the data portion of the file from the offline storage area of the system;

converting, by the processor, the data portion of the file, including decompressing and decrypting the data portion of the file to create a decompressed and decrypted data portion of the file; and returning, by the processor, the decompressed and decrypted data portion of the file directly to the requestor without writing the decompressed and decrypted data portion of the file to the online storage area of the system.

12. The computer program product of claim 11, wherein the read-only request includes a retrieve request that includes a read-only indicator that indicates that the data portion of the file should only be returned to an original count key data (CKD) format and then presented to the requestor as a standard read from a CKD device.

13. The computer program product of claim 11, wherein retrieving the data portion of the file includes issuing a software retrieve request using a volser as a container name, a data set name concatenated with a cylinder head location as an object name, and an indicator that the data portion of the file should be presented directly in CKD format as a normal read as opposed to storing the data portion of the file back to the online storage area of the system.

14. The computer program product of claim 11, wherein the requested file includes one or more physical extents.

15. The computer program product of claim 11, wherein the requested file includes read only data.

16. The computer program product of claim 11, wherein the requested file includes physical sequential data.

17. The computer program product of claim 11, wherein the metadata portion of the file further includes an identifier of one or more users associated with the file.

18. The computer program product of claim 11, wherein after the data portion of the file is retrieved, the data portion of the file is converted to a count key data (CKD) format.

19. The computer program product of claim 11, wherein storage management software receives the read-only request to access the file from the requestor, retrieves the data portion of the file from the offline storage area of the system, converts the data portion of the file to create the decompressed and decrypted data portion of the file, and returns the decompressed and decrypted data portion of the file directly to the requestor.

20. A system, comprising:

a hardware processor and logic integrated with the processor, executable by the processor, or integrated with and executable by the processor, the logic being configured to:

receive a read-only request from a requestor to access a file, where a data portion of the file is encrypted, compressed, and stored in an offline storage area of the system;

determine that the file is a nearline file, based on a metadata portion of the file stored in an online storage area of the system, where the metadata portion of the file includes an identifier of the file, a description of the data portion of the file, and a location of the data portion of the file within the offline storage area of the system;

determine the location of the data portion of the file within the offline storage area of the system, based on the metadata portion of the file;

retrieve the data portion of the file from the offline storage area of the system;

convert the data portion of the file, including decompressing and decrypting the data portion of the file to create a decompressed and decrypted data portion of the file; and return the decompressed and decrypted data portion of the file directly to the requestor without writing the decompressed and decrypted data portion of the file to the online storage area of the system.

* * * * *